Oct. 16, 1928.

F. L. GILLETT 1,687,649

CUTTER CLEARANCE GAUGE

Filed Sept. 8, 1927

INVENTOR:
FRANK L. GILLETT.

BY Ford W. Harris

ATTORNEY.

Patented Oct. 16, 1928.

1,687,649

UNITED STATES PATENT OFFICE.

FRANK L. GILLETT, OF LOS ANGELES, CALIFORNIA.

CUTTER CLEARANCE GAUGE.

Application filed September 8, 1927. Serial No. 218,131.

My invention relates to gauges and more particularly to a cutter clearance gauge.

Milling cutters and similar cutters are often used in shop practice. It is often desirable to determine the clearance angle of the teeth of these cutters when the cutters are being sharpened, or to check the clearance angle on a cutter already sharpened.

It is an object of my invention to provide a gauge for measuring an angle of a cutter tooth.

In sharpening such a cutter, it is mounted on an arbor in a milling or grinding machine. Cutter clearance gauges now on the market require that the cutter be removed from the arbor before an accurate check on the clearance angle can be obtained. This is due to the fact that the gauges now on the market have a boss or other means adapted to centralize in the opening through the center of the cutter.

It is an object of my invention to provide a cutter clearance gauge which will measure the clearance angle and other angles of a cutter without removing the cutter from its arbor or supporting shaft.

A further object of my invention is to provide a cutter clearance gauge which is adapted to operate on a wide number of sizes and types of cutters.

Another object of my invention is to provide a cutter clearance gauge which reads the cutter clearance angle directly on a scale.

Still another object of my invention is to provide such a gauge which may be operated by the use of one hand only.

Another object of my invention is to provide a cutter clearance gauge which will not cast heavy shadows on the tooth, the angle of which is to be measured.

Another object of my invention is to provide a cutter clearance gauge which measures an angle of a tooth with reference to a preceding and a succeeding tooth.

Still a further object of my invention is to provide a cutter clearance gauge which simultaneously contacts the cutting edges of a preceding and a succeeding tooth in measuring the angles of an intermediate tooth.

Still another object of my invention is to provide a cutter clearance gauge which may also be used to check the clearance angle on side-cutting cutters.

Another object of my invention is to provide a gauge which will measure secondary angles of a tooth of a cutter.

Further objects and advantages of my invention will be made evident in the following description.

Figure 1:
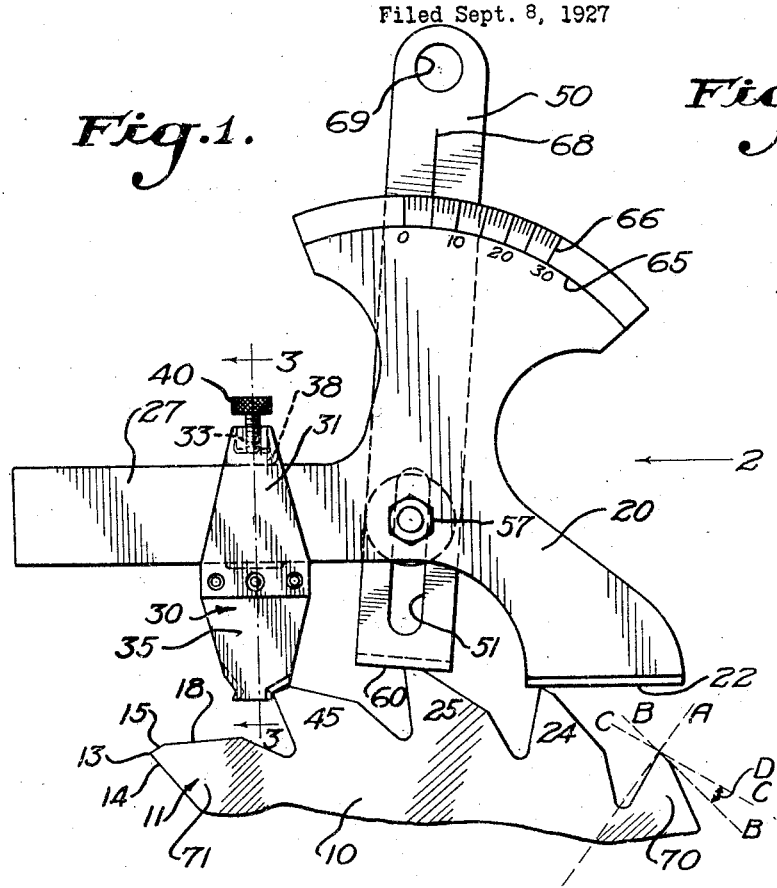
Fig. 1 illustrates a front view of the cutter clearance gauge of my invention when used for measuring the clearance angle of a cutter tooth.
Figure 2:
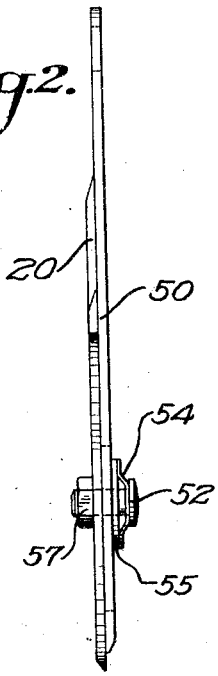
Fig. 2 is an end view of my device taken as indicated by the arrow 2 of Fig. 1.

The gauge of my invention is adapted to measure various angles on a cutter such as is commonly used in machine-shop practice. Such a cutter 10 is shown in Fig. 1, this cutter having teeth 11 spaced around the periphery thereof. Each tooth 11 has a cutting edge 13 formed at the junction of a surface 14 and a beveled surface 15. A line A—A in Fig. 1 joins the cutting edge of a tooth 11 and the axis about which the cutter 10 is rotated when in operation. A line C—C is drawn through the cutting edge 13 perpendicular to the line A—A. Another line B—B is drawn through the cutting edge and lies in the beveled surface 15. An angle D is subtended between the lines B—B and C—C. This angle D is what is commonly termed the cutter clearance angle of the tooth. It is necessary in successful operation that this angle D be an angle greater than zero degrees.

In certain cutters a surface 18 forms the back of each tooth 11. The angle between the line C—C and this surface 18 is commonly termed the secondary angle of the tooth. With these definitions in mind the usefulness of my device should be apparent.

Figure 3:
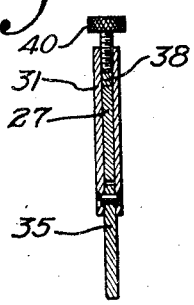
Fig. 3 is a vertical cross section of the slider of my invention and is taken substantially along the line 3—3 of Fig. 1.
Figure 4:
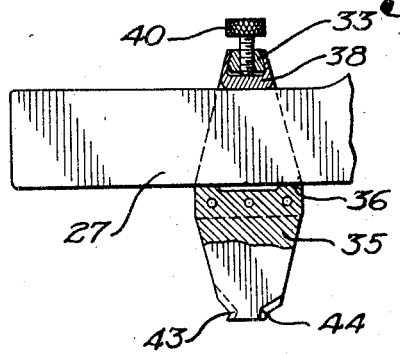
Fig. 4 is a front view of the slider, partially broken away.

My device is primarily designed to measure the cutter clearance angle D. As shown in Fig. 1 a blade 20 has a tooth-contacting surface 22 formed at one end thereof. This tooth-contacting surface is adapted to contact a tooth 24, succeeding in sequence a tooth 25, the clearance angle of which is to be measured. The point of contact between the tooth-contacting surface 22 and the tooth 24 may conveniently be along the cutting edge 13 of the tooth 24 as indicated in Fig. 1. The blade 20 has a leg 27 extending leftward therefrom. Adapted to slide along the leg 27 is a slider 30 of my invention. This slider is best shown in Figs. 1, 3, and 4, and comprises side plates 31 which extend on either side of the leg 27. A bridge 33 secures these side members together at the upper ends thereof. Mounted between the lower ends of the side plates 31 is an engager 35 having projections 36 which are adapted to engage the lower edge of the leg 27. The engager 35 is held against the lower edge of the leg 27 by means of a contactor 38 which rides along the upper edge of the leg 27. This contactor is forced into engagement with the leg 27 by means of a thumb screw 40 which is threaded through the bridge 33 and bears against the upper edge of the contactor 38. By tightening the thumb screw 40 the slider 30 is prevented from moving relative to the leg 27.

The engager 35 has notches 43 and 44 in the lower ends thereof, one on each edge of the slider 30. The bottom of either of these notches is adapted to engage the cutting edge of a tooth 45 preceding in sequence the tooth 25 which is to be measured. The notch 43 is designed for use with widely separated teeth and the notch 44 is designed for use with teeth close to each other. Either notch may be used by reversing the slider 30 on the leg 27. A line through the lower tooth contacting surface 22 will pass through the bottom of each of the notches 43 and 44.

An arm 50, having an elongated slot 51 along the axis thereof, is slidably and rotatably connected to the blade 20 by a pivot pin 52. This pivot pin has a spring arbor 54 mounted thereon, this spring arbor bearing against a washer 55. The washer 55 also bears against the arm 50. The pivot pin 52 passes through the elongated groove 51 of the arm 50 and the blade 20, and has a nut 57 screwed thereon. By suitably tightening the nut 57, it is possible to swing the arm 50 about the axis of the pivot pin 52. At the same time it is possible to slide the arm 50 relative to the blade 20, the pivot pin 52 following the elongated groove 51. The lower end of the arm 50 provides a surface 60 which is adapted to come in contact with the beveled surface of the tooth to be measured. The surface 60 is preferably at right angles to the axis of the swinging arm 50.

The upper end of the blade 20 provides a protractor scale 65 having markings 66 at the upper end thereof. A line 68 is scribed along the axis of the arm 50, and is adapted to form a reference line for reading the protractor markings 66.

It is a comparatively easy task to operate my invention. The slider 30 is so set that a portion of the tooth-contacting surface 22 will contact the tooth 24 at the cutting edge thereof when one of the notches contacts the cutting edge of the tooth 45. This setting is not critical as may be seen from the drawing inasmuch as the contacting surface 22 is of a considerable length. The gauge is then held in one hand and one finger placed through a hole 69 in the upper end of the arm 50. By exerting a pressure on this finger it is possible to pivot the arm 50 about the pivot pin 52 or slide it relative to this pin. If at this time the arm 50 is lowered into contact with the cutting edge 13 of the tooth 25 and is rotated about the pivot pin 52 until the surface 60 lies along the line C—C, the line 68 on the arm 50 will fall at the zero point on the protractor scale. If now the arm 50 is pivoted about the pin 52 and lowered slightly, it is possible to bring the surface 60 into contact with the beveled surface 15 of the tooth 25. This position is indicated in Fig. 1, and is the normal position for reading the clearance angle of a tooth. It will be noticed from Fig. 1 that the line 68 of the arm 50 corresponds to a reading of five degrees on the protractor scale. This angle would be the clearance angle on the tooth 25.

It is not necessary that the tooth-contacting surface 22 touch a tooth which is immediately adjacent to the tooth being measured nor is it necessary that one of the notches 43 or 44 contact a tooth which is immediately adjacent to the tooth being measured. The gauge would work equally well if the contacting surface 22 were placed in contact with the cutting edge of a tooth 70, and the notch were placed in contact with the cutting edge of a tooth 71. Thus, it should be understood that the terms "succeeding tooth" and "preceding tooth", as used in the appended claims, should not be limited to teeth immediately adjacent the tooth being measured. It is only necessary that there be an odd number of teeth between the tooth contacted by the surface 22 and that contacted by the notch, the tooth being measured being the central of this odd number of teeth. In other words, there must be an equal number of teeth between the tooth being measured and the teeth in contact with the surface 22 and the notch respectively. Thus my invention can be used on extremely small cutters having a very close spacing of teeth. In such an event the surface 22 and the notch might contact teeth which were almost diametrically opposite, and the correct clearance angle of the teeth could be correctly obtained. In this case, however, it might be necessary to remove the slider 30 from the leg 27 and rotate it through an angle of 180 degrees about its vertical axis and reinsert it thereon. This would bring the notch 43 into contact with a tooth, which would be necessary in the event that the bottom of the notch 44 did not contact the cutting edge of the tooth 13.

My gauge is also applicable to measuring the secondary angle of a tooth. In measuring such an angle the arm 50 would be so moved that the surface 60 thereof would be in contact with the surface 18 of the tooth 25. At this time the correct secondary angle could be read on the protractor scale, this angle being the angle between the line C—C and the surface 18.

My gauge could also be used in measuring the clearance angles and secondary angles of teeth formed on one side of a cutter. Such side-cutting teeth are comparatively common in machine-shop practice, and it is often difficult to determine the clearance angle by present methods. The operation of the device would be substantially the same in this case as in the case of a cutter having teeth spaced around the periphery thereof.

I claim as my invention:

1. In a gauge adapted to measure an angle of a cutter tooth, the combination of: a frame adapted to simultaneously contact the cutting edges of a preceding and a succeeding tooth; and means pivoted to said frame for measuring an angle of said cutter tooth.

2. In a gauge adapted to measure an angle of a cutter tooth, the combination of: a frame adapted to simultaneously contact a preceding and a succeeding tooth; and means pivoted to said frame for measuring an angle of said cutter tooth.

3. In a gauge adapted to measure an angle of a cutter tooth, the combination of: a frame adapted to contact the cutting edges of a preceding and a succeeding tooth; an arm adapted to contact a beveled surface of said tooth; and means for indicating the angle of said beveled surface.

4. In a gauge adapted to measure an angle of a cutter tooth, the combination of: a frame adapted to contact a preceding and a succeeding tooth; an arm adapted to contact a beveled surface of said tooth; and means for indicating the angle of said beveled surface.

5. In a gauge adapted to measure an angle of a cutter tooth, the combination of: a frame adapted to simultaneously contact the cutting edges of a preceding and a succeeding tooth; an arm pivoted to said frame and adapted to contact a beveled surface of said tooth; and a scale carried by said frame, said scale and said arm indicating the angle of said beveled surface.

6. In a gauge adapted to measure an angle of a cutter tooth, the combination of: a frame adapted to simultaneously contact a preceding and a succeeding tooth; an arm pivoted to said frame and adapted to contact a beveled surface of said tooth; and a scale carried by said frame, said scale and said arm indicating the angle of said beveled surface.

7. In a gauge adapted to measure an angle of a cutter tooth, the combination of: an adjustable frame adapted to simultaneously contact the cuttting edges of a preceding and a succeeding tooth; and means pivoted to said frame for measuring an angle of said cutter tooth.

8. In a gauge adapted to measure an angle of a cutter tooth, the combination of: an adjustable frame adapted to simultaneously contact a preceding and a succeeding tooth; and means pivoted to said frame for measuring an angle of said cutter tooth.

9. In a gauge adapted to measure an angle of a cutter tooth, the combination of: a frame adapted to simultaneously contact the cutting edges of a preceding and a succeeding tooth; an arm slidably and rotatably mounted on said frame and adapted to contact a beveled surface of said tooth; and a scale disposed on said frame, said scale and said arm indicating the angle of said beveled surface.

10. In a gauge adapted to measure an angle of a cutter tooth, the combination of: a frame adapted to simultaneously contact a preceding and a succeeding tooth; an arm slidably and rotatably mounted on said frame and adapted to contact a beveled surface of said tooth; and a scale disposed on said frame, said scale and said arm indicating the angle of said beveled surface.

11. In a gauge adapted to measure the angle of a cutter tooth, the combination of: a blade adapted to contact a succeeding tooth; a slider carried by said blade, said slider being adapted to contact a preceding tooth; a scale disposed on said blade; and an arm carried by said blade, said arm being adapted to contact a beveled surface of said tooth and to indicate the angle of said beveled surface on said scale.

12. In a gauge adapted to measure the angle of a cutter tooth, the combination of: a blade adapted to contact the cutting edge of a succeeding tooth; a slider carrier by said blade, said slider being adapted to contact the cutting edge of a preceding tooth; a scale disposed on said blade; and an arm carried by said blade, said arm being adapted to contact a beveled surface of said tooth and to indicate the angle of said beveled surface on said scale.

13. In a gauge adapted to measure the angle of a cutter tooth, the combination of: a blade adapted to contact a succeeding tooth; a slider carried by said blade, said slider being adapted to contact a preceding tooth; a scale secured to said blade; and an arm slidably and rotatably carried by said blade, said arm being adapted to contact a beveled surface of said tooth and to indicate the angle of said beveled surface on said scale.

14. In a gauge adapted to measure an angle of a cutter tooth, the combination of: a frame having at one end a notch adapted to contact the cutting edge of a tooth preceding in sequence the tooth being measured; a straight edge on the other end of said frame and in line with the vertex of said notch, said straight edge contacting the cutting edge of a tooth succeeding in sequence the tooth being measured; and means carried by said frame for measuring an angle of the said tooth being measured.

15. In a gauge adapted to measure an angle of a cutter tooth, the combination of: a frame adapted to simultaneously contact the cutting edges of a preceding and a succeeding tooth; an arm carried by said frame and adapted to contact a beveled surface of said tooth; and a scale carried by said frame, said scale and said arm indicating the angle of said beveled surface.

16. A combination as defined in claim 14 in which said means comprises an arm slidably and pivotally secured to said frame whereby a surface of said arm contacts the surface of the tooth which it is desired to measure, and including a scale for directly reading the angle to be measured.

17. A combination as defined in claim 14 in which said notch may be moved with its vertex in line with said straight edge.

In testimony whereof, I have hereunto set my hand at Los Angeles, California, this 31st day of August, 1927.

FRANK L. GILLETT.